(No Model.)
C. W. TERPENING.
BICYCLE BRAKE.
No. 572,137. Patented Dec. 1, 1896.
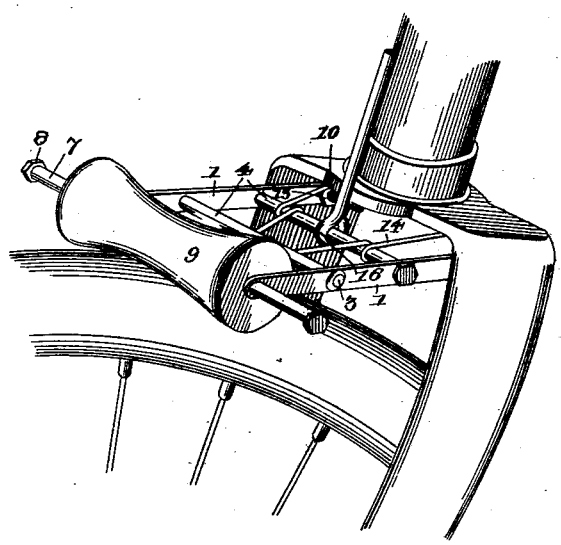
Fig. 1.
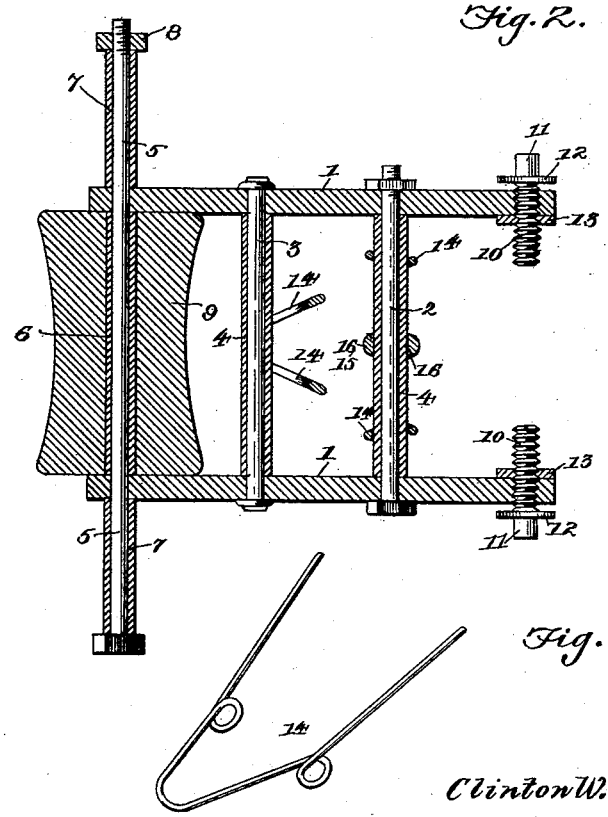
Fig. 2.
Fig. 3.
Witnesses
P. Lloyd Mockabee.
R. M. Smith.
Inventor
Clinton W. Terpening.
By his Attorneys,
C. A. Snow & Co.

UNITED STATES PATENT OFFICE.

CLINTON W. TERPENING, OF BEDFORD, IOWA.

BICYCLE-BRAKE.

SPECIFICATION forming part of Letters Patent No. 572,137, dated December 1, 1896.

Application filed February 11, 1896. Serial No. 578,894. (No model.)

*To all whom it may concern:*

Be it known that I, CLINTON W. TERPENING, a citizen of the United States, residing at Bedford, in the county of Taylor and State of Iowa, have invented a new and useful Bicycle-Brake, of which the following is a specification.

This invention relates to an improvement in bicycle-brakes; and the object thereof is to provide a simple, inexpensive, and efficient brake which may be readily attached to any bicycle in common use and which may be arranged in such manner or connected with the usual brake rod or plunger so that the said brake may be operated either by the hand-lever or by the pressure of one or both feet.

A further object of the invention is to construct the said brake so that it will accurately fit any sized fork and be capable of adjustment for taking up wear and preventing rattling.

With the above objects in view the invention consists in certain novel features and details of construction and arrangement of parts, as hereinafter fully described, illustrated in the drawings, and finally pointed out in the claim.

In the accompanying drawings, Figure 1 is a perspective view of the improved brake shown in its applied position. Fig. 2 is a horizontal section through the same. Fig. 3 is a detail perspective view of the spring.

Similar numerals of reference designate corresponding parts in the several figures of the drawings.

Referring to the accompanying drawings, the improved brake is shown to comprise spaced parallel bars or side pieces 1, which are preferably formed of steel and each in a single piece. These bars are connected intermediate their ends by a cross-bolt 2 and a cross-rivet 3, around both of which are placed metal sleeves 4, formed from sections of tubing equal to each other in length and also equal to the predetermined distance between the bars 1, said sleeves serving to space such distance and form at their extremities shoulders, against which the bars 1 firmly bear.

The arms or bars 1 have transversely-alined openings at their outer or swinging extremities to receive a long bolt 5, which projects at its extremities considerably beyond said bars upon each side of the frame. Around this long bolt and between the bars 1 is placed a metal spacing-sleeve 6, and similar sleeves 7 are disposed around the projecting ends of the bolt 5, being held in place by means of nuts 8 or by heading the bolt at its extremities. 9 designates the brake-shoe which is in the form of a roller journaled upon the spacing-sleeve 6 between the bars 1, and preferably having its peripheral surface concaved, so as to partially embrace the pneumatic tire of the wheel.

The inner end of each bar 1 is formed with a threaded opening through which passes transversely the threaded shank portion 10 of a pin or pivot 11. The fork at a point adjacent to its crown and just beneath the same is formed at each side with a perforation or socket to receive loosely the outwardly-projecting ends of such pins or pivots, and each pin or pivot is provided with a circumferential or disk-shaped shoulder 12, which will prevent the extremity of the pin from entering the perforation or socket in the fork too far. By means of the slits in the inner ends of these pins or pivots, as shown in the drawings, and with the aid of a screw-driver said pins or pivots may be adjusted until the shoulders 12 contact with the fork, after which said pins may be prevented from becoming loose by means of jam-nuts 13 bearing against the inside surfaces of the bars 1.

14 designates a spring, made, preferably, of a single section of wire bent at its center to form a lip or stop, resting beneath the forward intermediate spacing-sleeve 4, after which the terminals of the wire are given each one coil around the inner or rear spacing-sleeve 4, from whence the terminals are extended under and terminate beneath the crown of the fork from which they obtain their bearing. This spring, it will thus be seen, serves to uphold the brake out of contact with the tire and to guard against rattling and wear of the brake against the fork-crown.

The construction above described affords a simple, inexpensive, and yet reliable and safe brake for bicycles, and the shape of the roller employed as the brake-shoe renders the same particularly valuable for use in connection with pneumatic tires, where it has been found impracticable to use the ordinary rigid brake-spoons. The roller will obviate any abrasion of the outer case or cover of the tire, and by means of the projecting ends of the long bolt, upon which the roller is mounted, the brake-frame may be vibrated by the application of one or both feet to such projecting ends. Where used by ladies, it may be found preferable to employ the ordinary hand-lever and brake rod or plunger extending longitudinally of the machine-head. In this event the lower extremity of such rod or plunger may be formed, as at 16, to embrace one of the cross-bars or spacing-sleeves of the brake-frame, whereby upon working the hand-lever the brake will be vibrated into frictional contact with the tire.

By means of the particular form given to the pivots 11 and the manner in which they are rendered adjustable in and through the bars 1 it will be seen that it is possible to adjust the brake to the particular fork desired with great accuracy, so that there will be no vexatious rattling to annoy the rider.

It will be apparent that changes in the form, proportion, and minor details of construction may be resorted to without departing from the spirit or sacrificing any of the advantages of this invention.

Having thus described the invention, what is claimed as new is—

A bicycle-brake, consisting of a suitable frame, adjustable pivots formed with shoulders intermediate their ends and having a threaded connection with the brake-frame and adapted to engage sockets in the fork of the machine, a brake-shoe attached to said frame, and means for oscillating the brake-frame, substantially as described.

In testimony that I claim the foregoing as my own I have hereto affixed my signature in the presence of two witnesses.

CLINTON W. TERPENING.

Witnesses:
E. H. CORWIN,
T. H. EDWARDS.